(12) United States Patent
Sheridan

(10) Patent No.: US 11,971,289 B2
(45) Date of Patent: Apr. 30, 2024

(54) TANK FILL CONTROL APPARATUS AND METHOD

(71) Applicant: Tara Oilfield Services LTD, Didsbury (CA)

(72) Inventor: Martin Sheridan, Didsbury (CA)

(73) Assignee: Tara Oilfield Services LTD., Didsbury (CA)

( * ) Notice: Subject to any disclaimer, the term of this patent is extended or adjusted under 35 U.S.C. 154(b) by 0 days.

(21) Appl. No.: 18/205,463

(22) Filed: Jun. 2, 2023

(65) Prior Publication Data

US 2023/0304844 A1   Sep. 28, 2023

Related U.S. Application Data

(60) Continuation of application No. 17/192,840, filed on Mar. 4, 2021, now Pat. No. 11,686,605, which is a division of application No. 16/289,504, filed on Feb. 28, 2019, now Pat. No. 10,955,277.

(60) Provisional application No. 62/637,283, filed on Mar. 1, 2018.

(51) Int. Cl.
| | |
|---|---|
| *G01F 23/18* | (2006.01) |
| *G01F 23/44* | (2006.01) |
| *G01F 23/60* | (2006.01) |
| *G05D 9/12* | (2006.01) |

(52) U.S. Cl.
CPC ............ *G01F 23/185* (2013.01); *G01F 23/44* (2013.01); *G05D 9/12* (2013.01); *G01F 23/60* (2013.01)

(58) Field of Classification Search
CPC ........ G01F 23/185; G01F 23/44; G01F 23/60; G05D 9/12
See application file for complete search history.

(56) References Cited

U.S. PATENT DOCUMENTS

| | | | |
|---|---|---|---|
| 8,371,728 B2 | 2/2013 | Hente et al. | |
| 8,534,499 B2 | 9/2013 | Williams et al. | |
| 2012/0056749 A1 | 3/2012 | Smith | |
| 2013/0293388 A1 | 11/2013 | Ingalsbe et al. | |
| 2014/0345700 A1 | 11/2014 | Surawski et al. | |
| 2017/0138498 A1 | 5/2017 | Kayser | |

FOREIGN PATENT DOCUMENTS

| | | |
|---|---|---|
| CN | 206638317 U | 11/2017 |
| JP | 08327490 A * | 12/1996 |

OTHER PUBLICATIONS

Canadian Patent Application 2,997,144, Office Action dated Jun. 19, 2019 (5 pgs).

(Continued)

*Primary Examiner* — Peter J Macchiarolo
*Assistant Examiner* — John M Royston
(74) *Attorney, Agent, or Firm* — Thayne and Davis LLC; Matthew D. Thayne

(57) ABSTRACT

Tank-installable switches for installation through a thief hatch port on a tank. In some embodiments, the switch may comprise a tubular body and a liquid level sensor. The liquid level sensor may include: a detector; a float in and moveable along a length of the lower end; and a rod connecting the float to the detector. The liquid level sensor may be configured to sense a liquid level relative to the lower end and further configured to generate a signal when at least a maximum selected liquid level is sensed.

7 Claims, 8 Drawing Sheets

(56) References Cited

OTHER PUBLICATIONS

CN206638317U, Guan, et al. / Machine Translation (7 pgs).
Canadian Patent Application 2,997,144, Office Action dated Dec. 4, 2018 (4 pgs).
Website: Magnetic Level Indicators & Switches. Mahalaxmi Instruments. http://www.mahalaxmiinstruments.com/magnetic-level-indicators-switches.html Caputred via Wayback machine: Nov. 13, 2016 (3 pgs).
U.S. Appl. No. 16/289,504, Office Action dated Aug. 18, 2020 (9 pgs).
U.S. Appl. No. 17/192,840, Office Action dated Sep. 19, 2022 (12 pgs).

\* cited by examiner

TANK FILL CONTROL APPARATUS AND METHOD

RELATED APPLICATIONS

This is a continuation of U.S. patent application Ser. No. 17/192,840 filed on Mar. 4, 2021, and titled TANK FILL CONTROL APPARATUS AND METHOD, which is a divisional of U.S. patent application Ser. No. 16/289,504 filed on Feb. 28, 2019, also titled TANK FILL CONTROL APPARATUS AND METHOD, which claims the benefit under 35 U.S.C. § 119(e) of U.S. Provisional Patent Application No. 62/637,283 filed on Mar. 1, 2018. Each of the aforementioned applications is hereby incorporated herein by reference in its entirety.

FIELD

The invention relates to control apparatus for monitoring and controlling liquid tank fill operations and related methods.

BACKGROUND

Tanks are used in oilfield operations to store liquids such as oil, fuel and water for use and from production. The liquids can contain volatiles and environmentally troublesome contaminants such as hydrocarbons, acid and salts. The tanks may include fixed or moveable such as, for example, API 12F type tanks or the like or tanks for transport of liquids such as truck or rail car transport tanks.

In some cases, the tanks are filled directly by an operator who is monitoring the fill operation. In some other applications, the tanks are being filled automatically without close observation.

Being intended for containment of these liquids, the tanks may include an interior coating, a lower fill port and an upper access port with a closure, sometimes a pressure relief closure (may be termed a thief hatch). However, the tanks otherwise are fairly low tech. As such, sometimes spills occur. In particular, the tank may be overfilled and a spill may occur. Also, sometimes overpressure conditions occur where the interior pressure exceeds what the upper port closure can handle. This may result in damage to the tank, such as by blowing out the closure.

SUMMARY OF THE INVENTION

A tank fill control apparatus, also referred to herein as a tank fill switch, has been invented to assist tank fill operations: to avoid overfilling and possibly over pressure conditions.

In one embodiment of the present invention, there is provided a tank fill control apparatus comprising: a tank-installed switch, including: a tubular body including an upper end, a lower end, and an annular mounting flange on an outer surface between the upper end and the lower end; a liquid level sensor including a detector, a float in and moveable along a length of the lower end and a rod connecting the float to the detector, the liquid level sensor configured to sense a liquid level relative to the lower end and further configured to generate a signal when at least a maximum selected liquid level is sensed; and a control unit in communication with the tank-installed switch including: a liquid level monitoring function for receiving the signal from the liquid level sensor; and a control function for generating at least one of (i) an alert signal indicating that the maximum selected liquid level is sensed and (ii) a valve control to modify a fill operation from a tank fill system.

According to another aspect of the present invention, there is provided a tank fill control installation for an oil and gas worksite, the installation comprising: a tank with an upper port and a flange about the upper port; a tank-installed switch, including: a tubular body including an annular mounting flange bolted to the flange of the upper port, an upper body extending above the annular mounting flange and a lower body extending from the annular mounting flange through the port and having a tubular wall residing within the tank; a liquid level sensor including a detector, a float in and moveable along a length of the tubular wall and a rod connecting the float to the detector, the liquid level sensor configured to sense a liquid level relative to the lower end and further configured to generate a signal when at least a maximum selected liquid level is sensed; and a control unit in communication with the tank-installed switch including: a liquid level monitoring function for receiving the signal from the liquid level sensor; and a control function for generating at least one of (i) an alert signal indicating that the maximum selected liquid level is sensed and (ii) a valve control to modify a fill operation from a tank fill system.

According to another aspect of the present invention, there is provided a method for monitoring a liquid fill operation into a tank, the method comprising: opening an upper port of the tank; installing a tank-installed switch onto the tank, the tank-installed switch including: a tubular body including an upper end, a lower end defined as a tubular wall, and an annular mounting flange on an outer surface between the upper end and the lower end; a liquid level sensor including a detector, a float in and moveable along a length of the tubular wall and a rod connecting the float to the detector, the liquid level sensor configured to sense a liquid level relative to the lower end and further configured to generate a signal when at least a maximum selected liquid level is sensed; inserting the tubular wall through the upper port to thereby position the float in the tank at a position corresponding with the maximum liquid level; connecting the annular mounting flange to the upper port; supporting control unit on a surface adjacent the tank; and establishing communications between the detector and the control unit; monitoring the liquid level during a fill operation; and generating an alert from the control unit regarding the fill operation if the maximum selected liquid level is sensed by the tank-installed switch.

BRIEF DESCRIPTION OF THE DRAWINGS

FIGS. 1A to 1C are together a schematic view of a tank fill switch according to the present invention, wherein FIG. 1A illustrates schematically the tank-installed portion of the switch and FIGS. 1B and 1C illustrate schematically a front side and a side view of the control unit;

In the drawings identical numbers indicate similar, but not always identical, parts.

DETAILED DESCRIPTION OF VARIOUS EMBODIMENTS

Figure 1A:
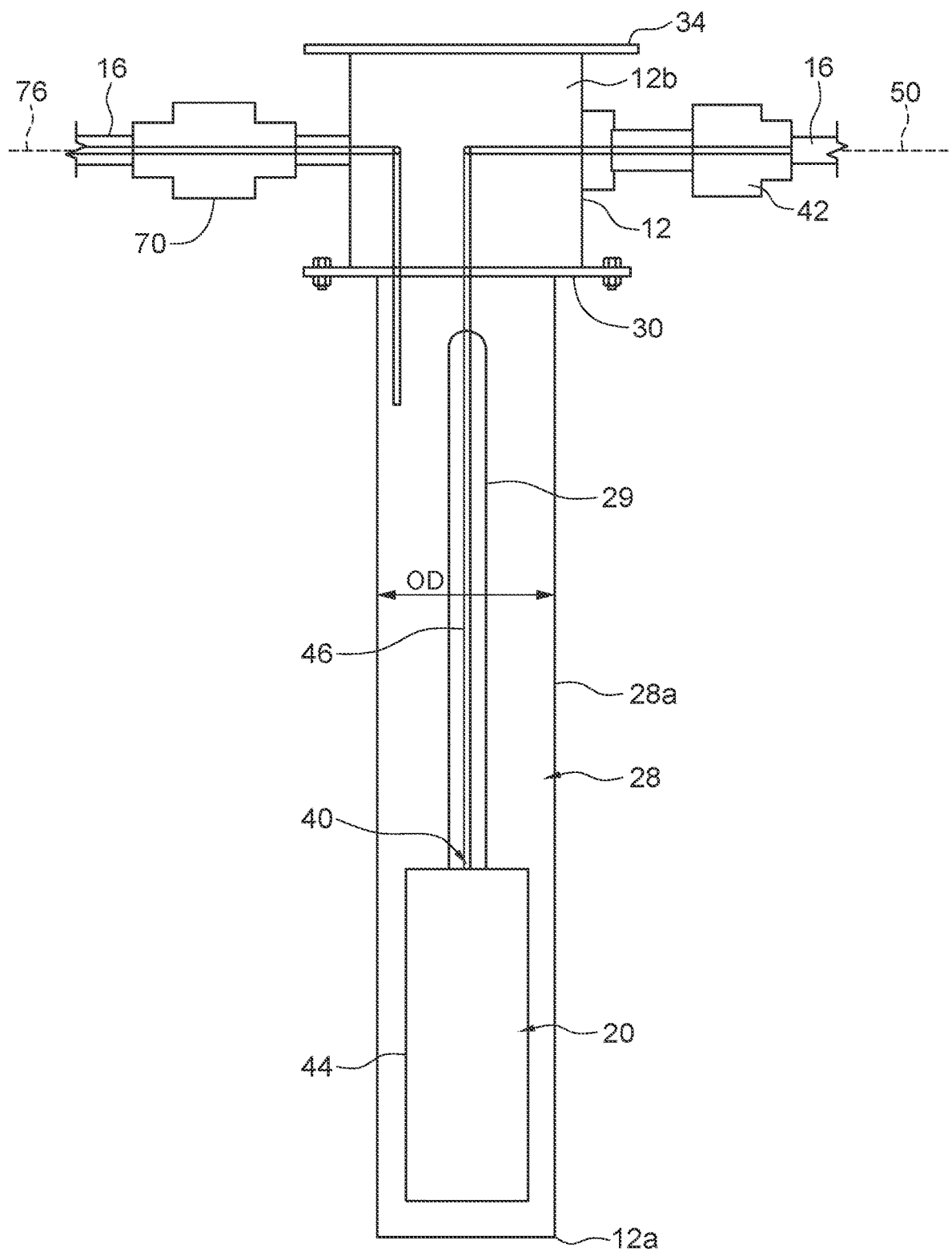
Figure 1B:
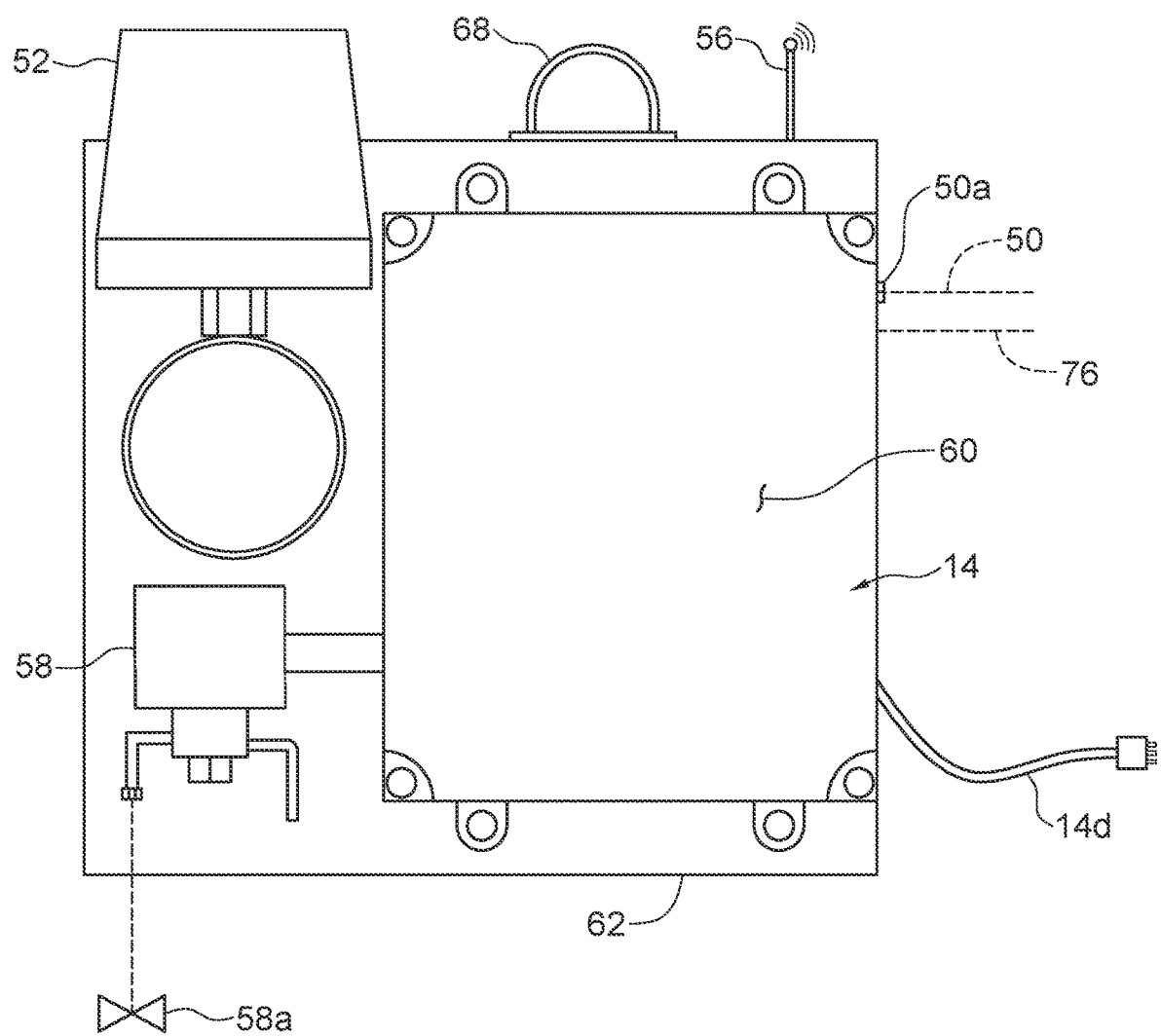
Figure 1C:
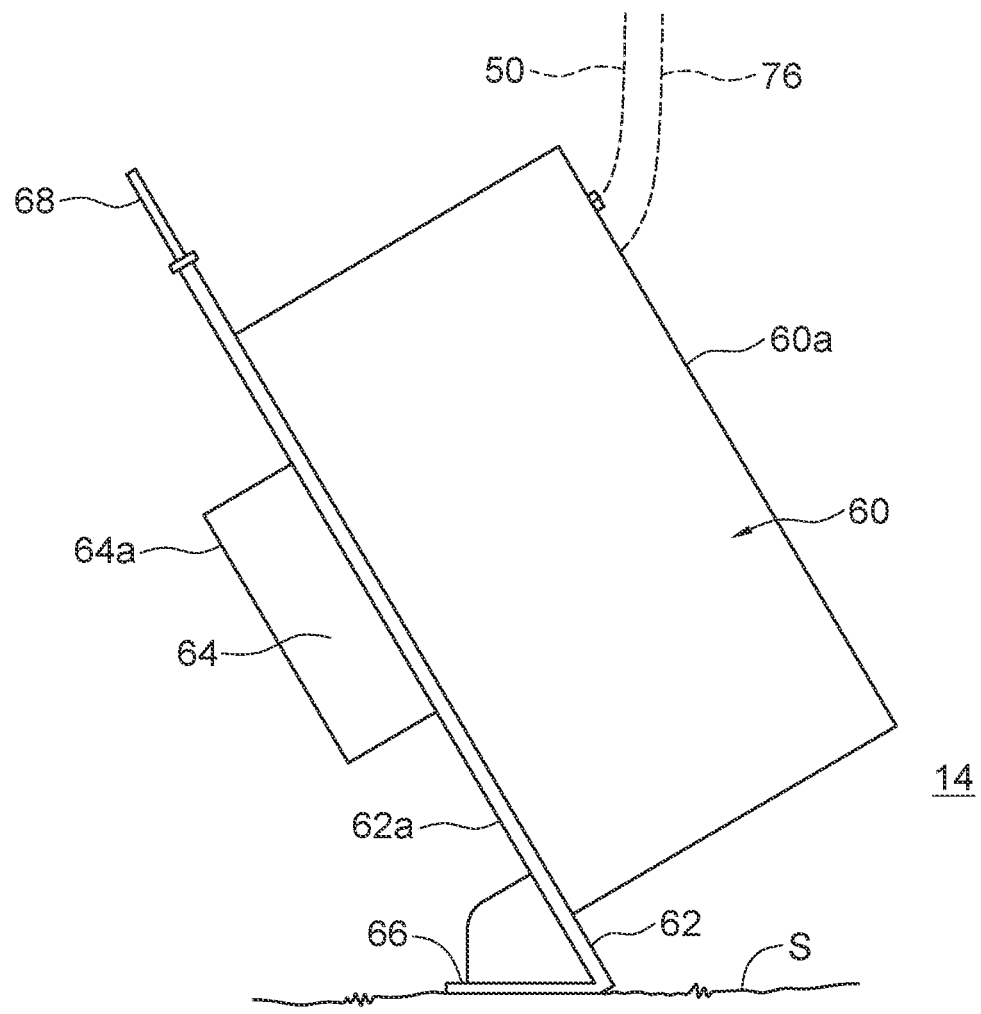

Various embodiments of tank fill switches are shown in FIGS. 1A to 5.

A tank fill switch as disclosed is portable and easy to use. The tank fill switch 10 includes a tank-installed switch 12 and a control unit 14. The tank-installed switch and the control unit are each in communication with the other such as by lines 16 or wirelessly.

Tank-installed switch 12 is configured for installation on a tank 20 into the upper port 22 after the upper port closure, which may be for example a thief hatch 24, is removed from the port's flange connection 26. The switch is installed in the upper port with its lower end 12a extending down into the tank and its upper end 12b exposed outside the tank.

Lower end 12a, also called a "stinger", is a tubular structure with a tubular wall 28. Tubular wall 28 has an outer wall surface 28a that defines an outer diameter OD. The outer diameter OD is selected to readily fit through upper port 22 such that the wall 28 can extend into the interior of the tank. Tubular wall 28 further has an inner tubular wall 28b that defines a hollow inner diameter. Tubular wall 28 permits fluid communication therethrough to upper end 12b. In one embodiment, wall 28 includes an aperture 29 therethrough which permits fluid communication between outer wall surface 28a and inner tubular wall 28b. In one embodiment, aperture 29 is a slot that extends axially along the wall and terminates adjacent upper end 12b.

The tank-installed switch 12 upper end 12b has a configuration to fit onto the upper port. For example, in the illustrated embodiment upper end has a flange 30 that is sized and has a configuration of boltholes 31 to fit onto and be bolted to upper port 22. Flange 30 extends radially from the outer surface of, and extends circumferentially about, the body. The location of flange 30 separates lower end 12a from upper end 12b. Bolts 32 or other fasteners may be installed to secure flange 30 to upper port 22. As such, the tank and the tank's upper port need not be modified in any way to accept the tank-installed switch 12. The tank's inner polymeric coating need not be compromised. Further, using simple tools, the tank-installed switch 12 can be readily installed and then easily removed, as desired. A common port size is 6-8". Of course, the switch may be configured for other types of port installations such as through an NPT connection, welding, etc.

The upper end may further include an open top and a hollow inner diameter ID. The hollow inner diameter extends between the open top and the inner tubular wall 28b of the lower end, such that there is fluid communication into the tank through the upper port. In one embodiment, the open top is surrounded by a second flange 34 also conforming to the size and bolthole configuration of the tank's upper port 22. This permits thief hatch 24 to be reinstalled on the tank switch, if desired, such that the tank continues to have a pressure relief capability through hatch 24 installed at the upper end of the tank switch. Alternately, the tank switch may include a closed upper end, a separate cap or, if the thief hatch is not employed, another relief valve can be installed on the switch.

Tank-installed switch 12 further includes a liquid level sensor 40 configured to sense the liquid level L in the tank and further configured to communicate at least when a maximum selected liquid level, and thereby a filled condition, is sensed. In one embodiment, liquid level sensor includes a float switch having a detector 42, a float 44 and a rod 46 connecting the float to the detector.

Float 44 may be selected to float on typical oilfield liquids such as water and oil based liquids. In one embodiment, the float is constructed of a durable material that is generally inert to typical oilfield liquids. A useful material is, for example, stainless steel which operates well for gaseous, sour service, acid, hydrocarbons and water of all types. Float 44 may, in such an embodiment, be a structure with an outer shell of stainless steel and a hollow or low density-filled internal chamber.

Float 44 may be sized to ride up and down within tubular wall 28. While the float could be configured to extend down from the upper end without the tubular wall 28, the tubular wall contains the float, facilitates its insertion down through upper port 22 and maintains the float and rod 46 centered relative to the upper end and detector 42 to prevent binding. Slot 29 permits fluid communication from externally of the tubular wall to internally to prevent a pressure lock above the float and to ensure that pressure remains communicated to any pressure relief mechanisms, such as the thief hatch, at the upper end.

The rod 46 communicates upward movement, for example caused by floating, of the float to the detector. The rod is rigid and constructed of a durable material that is generally inert to typical oilfield liquids. The length of rod 46 determines how far down the float resides in the tank and therefore the liquid level that is necessary to reach the float and cause the float to move up.

The detector 42 acts as a sensor receiving input from rod 46 to detect a fill condition by detecting when the float is moved up by floating on the liquid level, which is when the tank is filled. The detector is configured to at least identify when either (a) the liquid level reaches the float and the float begins to move up or (b) the liquid level reaches the float and the float has moved up a selected amount. Each of (a) and (b) can be used to indicate a fill condition.

The detector also is configured to communicate that fill condition to control unit 14. Detector 42 is connected, either in a wired configuration 16 or wirelessly, to communicate with control unit 14. In the illustrated embodiment, for example, line 50 extends from the detector to the control unit. The detected fill condition is communicated to a fill condition monitoring function 14a of the control unit through the connection.

In one embodiment, detector 42 is an on-off switch. Once the switch is actuated by suitable movement of the float and the rod, a signal is sent via a circuit, for example, such as one shown in FIG. 2B, to control unit 14. The switch in detector 42 may be selected with a rating Class I, Div 1 to even be useful in areas where flammable gases may be present.

Control unit 14, in turn, is configured with a function 14b to provide an alert signal of the fill condition to the operator. The alert can be in any one or more of various modes including visual, audible or electronic notification signal. For example, the control unit can provide a visual alert via a beacon 52, such as a flashing or strobe signal light, mounted on the control unit, on a remote panel or separately near the fill area. There may also be a speaker for emitting an audible alarm or an emitter 56 for an electronic notification 56a at a control panel in a nearby control room, on a personal communication device, such as a phone or pager, or through a remote monitoring system such as a SCADA system. The control unit can communicate the alert signals via wired or wireless communications. For example, beacon 52 is illustrated as connected via a communication connection 54, such as a wire, to the control unit, while emitter 56 is operating wirelessly. Beacon 52 may be mounted on, or mounted remotely from, the control unit. Beacon may also be storable on the control unit but detachable for mounting nearby the control unit.

Control unit 14, may also be configured to control the actual filling operation. For example, in addition or alternately to providing an alert signal of the fill condition to the operator, control unit 14 can include a control functionality to modify the fill operation such as to shut down the fill operation, to bleed down pressure and/or to open a flow diversion to a pipeline or alternate tank. For example, a pump may be shutdown or actuated, a bleed down may be initiated, a valve may be opened or closed, etc. for pressure relief, diverted flow or redirect filling instead of to the monitored tank or overflow filling from the monitored tank to an alternate tank or pipeline. In one embodiment, for example, control unit 14 includes a fill control with a valve control function 58 with physical (for example, electrical, pneumatic or hydraulic) or wireless communication 58b to a valve 58a for filling control such as discontinuance, modification or redirection to an alternate tank or pipeline. In one embodiment, valve control function 58 is a solenoid valve with a pneumatic connection 58b to valve 58a.

Control unit 14 may be constructed in various ways. The unit includes various electrical, electronic and/or software mechanisms configured for operation of the various signal receiving function 14a and alerting functions 14b. Control unit 14 may have relays for interaction with main control centers, displays or connections to other instruments.

Control unit 14 may include a power input 14d such as an onboard battery or a connection from a power supply such as a grid, a generator, solar or a rig power generation.

In one rugged embodiment, control unit 14 includes a durable housing 60 such as one configured to be weather proof and explosion resistant, for example rated as Class I, Div 1 or Class I, Div 2. The housing may be installed on a mounting frame 62. The mounting frame may be configured for mounting including bolt hole arrangements, hooks, magnets, etc. In one embodiment, for example, the mounting frame may include one or more magnets 64 for installation of the control unit by magnetic attraction to the tank or an adjacent metal structure such as a skid. The magnet may be a strong magnet capable of supporting the weight of the control unit including the bracket and any connections thereto with magnetic attachment to a metal surface. The magnet may be installed on the backside 62a of the frame while the housing for control unit 14 is supported on the opposite, frontside. The magnet may be shaped concavely on its backside 64a to fit securely against the exterior surface curvature of a tank.

Frame 62 may be configured to self-support in an upright position on a ground or other support surface S. For example, frame 62 may include a support 66, such as a base or leg. The support 66 may be configured, such as angled relative to the front side, to support the housing in a position angled with a front surface 60a thereof facing generally upwardly.

Figure 2A:
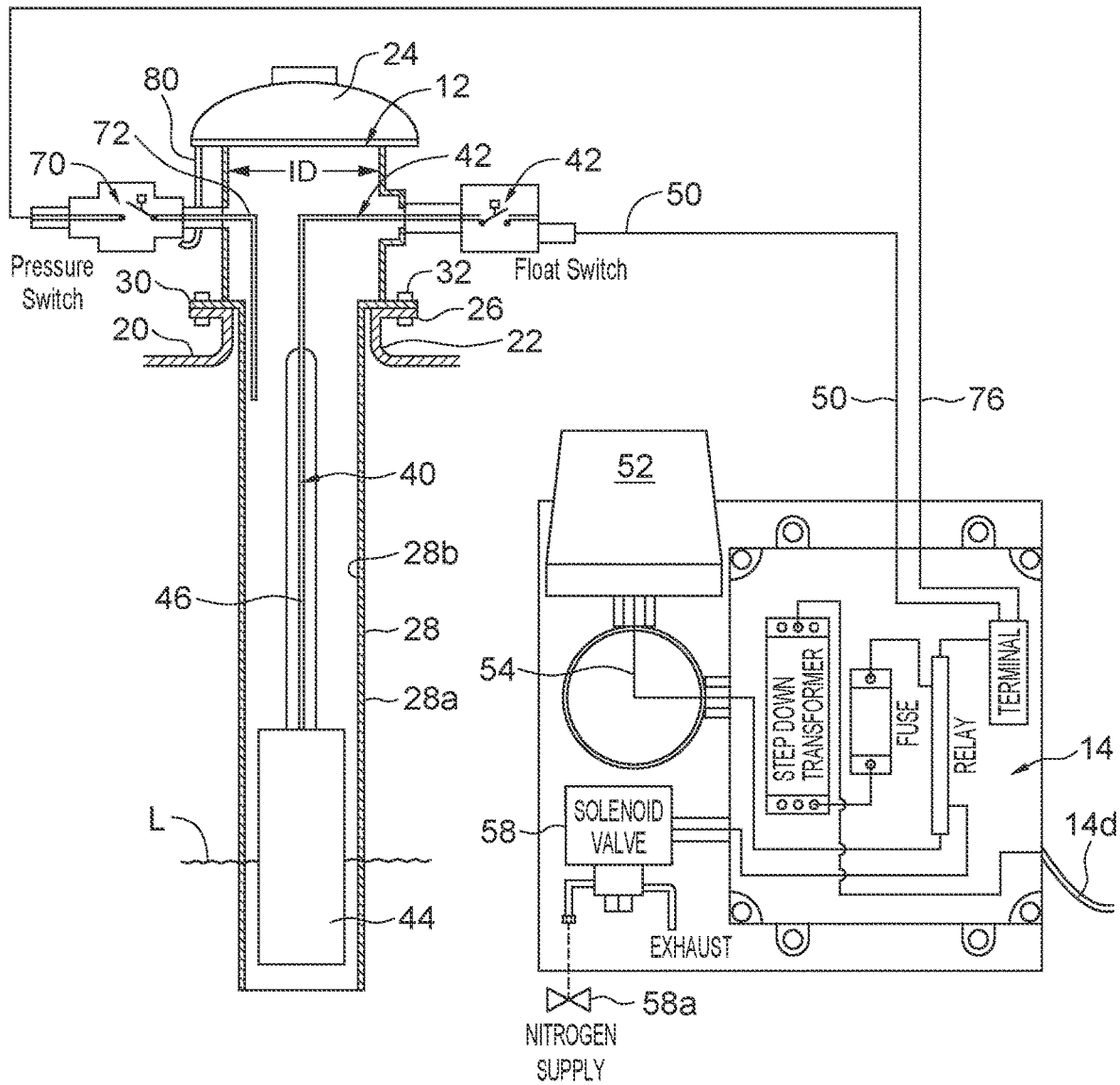
FIG. 2A is a schematic view, partly in section, of a tank fill switch installed for monitoring a fill operation of a tank.
Figure 2B:
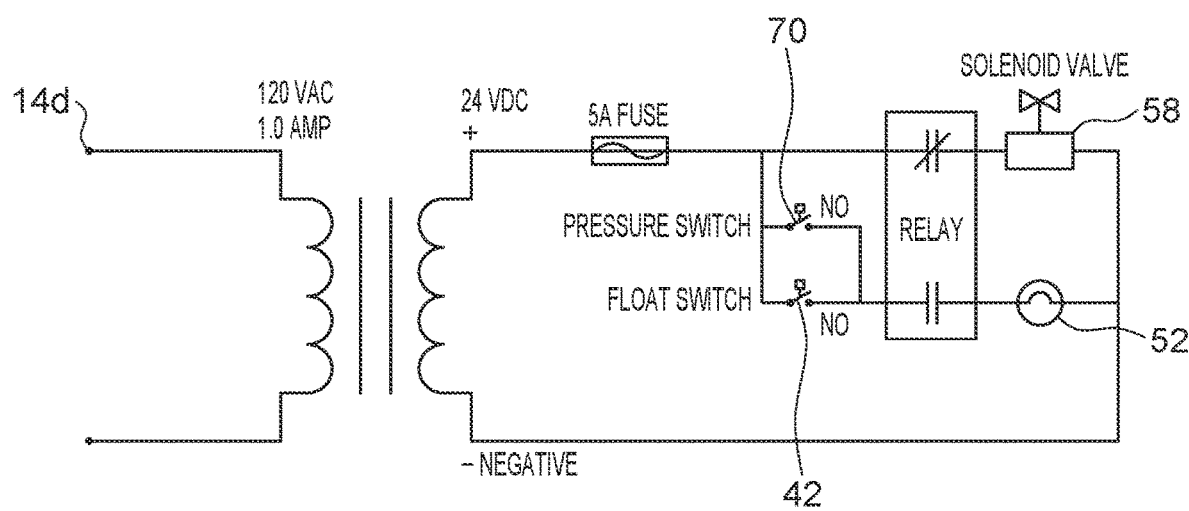
FIG. 2B is an electrical diagram of a possible circuit for the tank fill switch.
Figure 3:
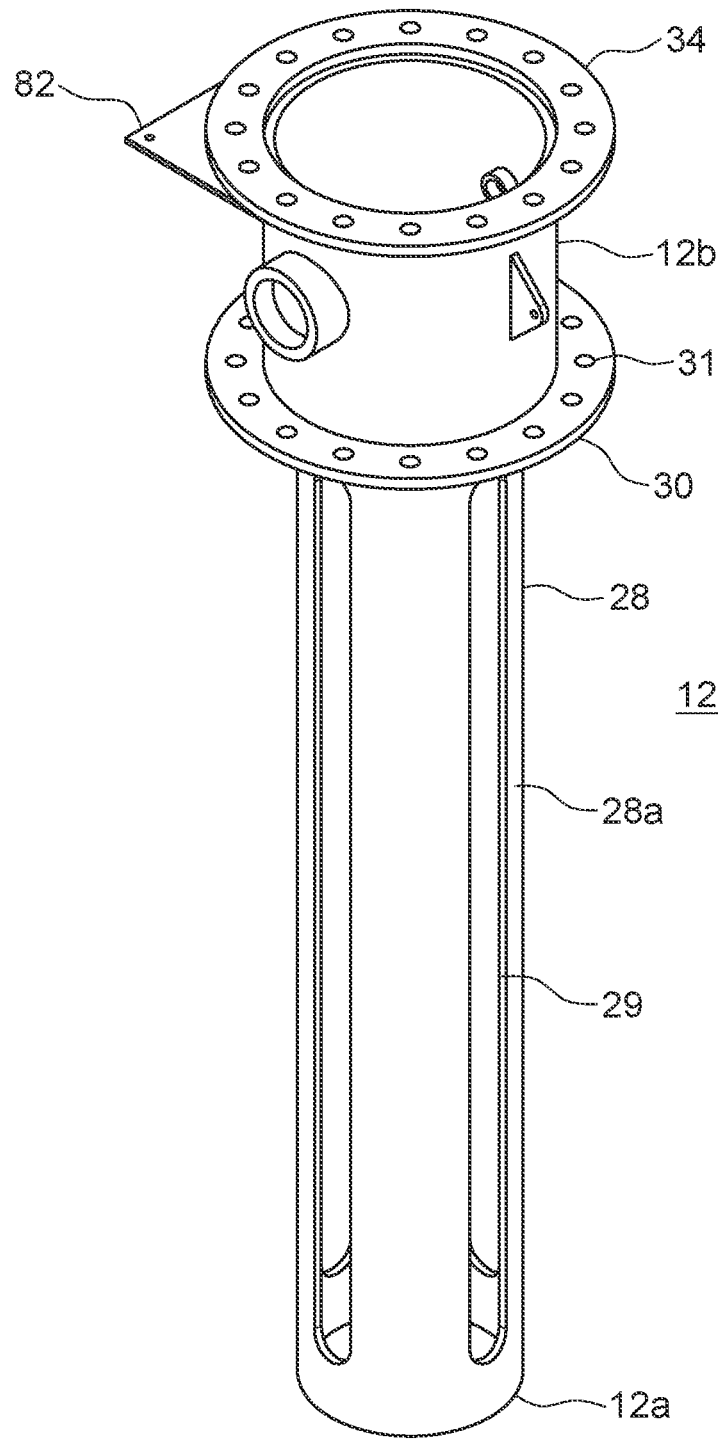
FIG. 3 is a top perspective view of a body for a tank-installed fill switch.
Figure 4:
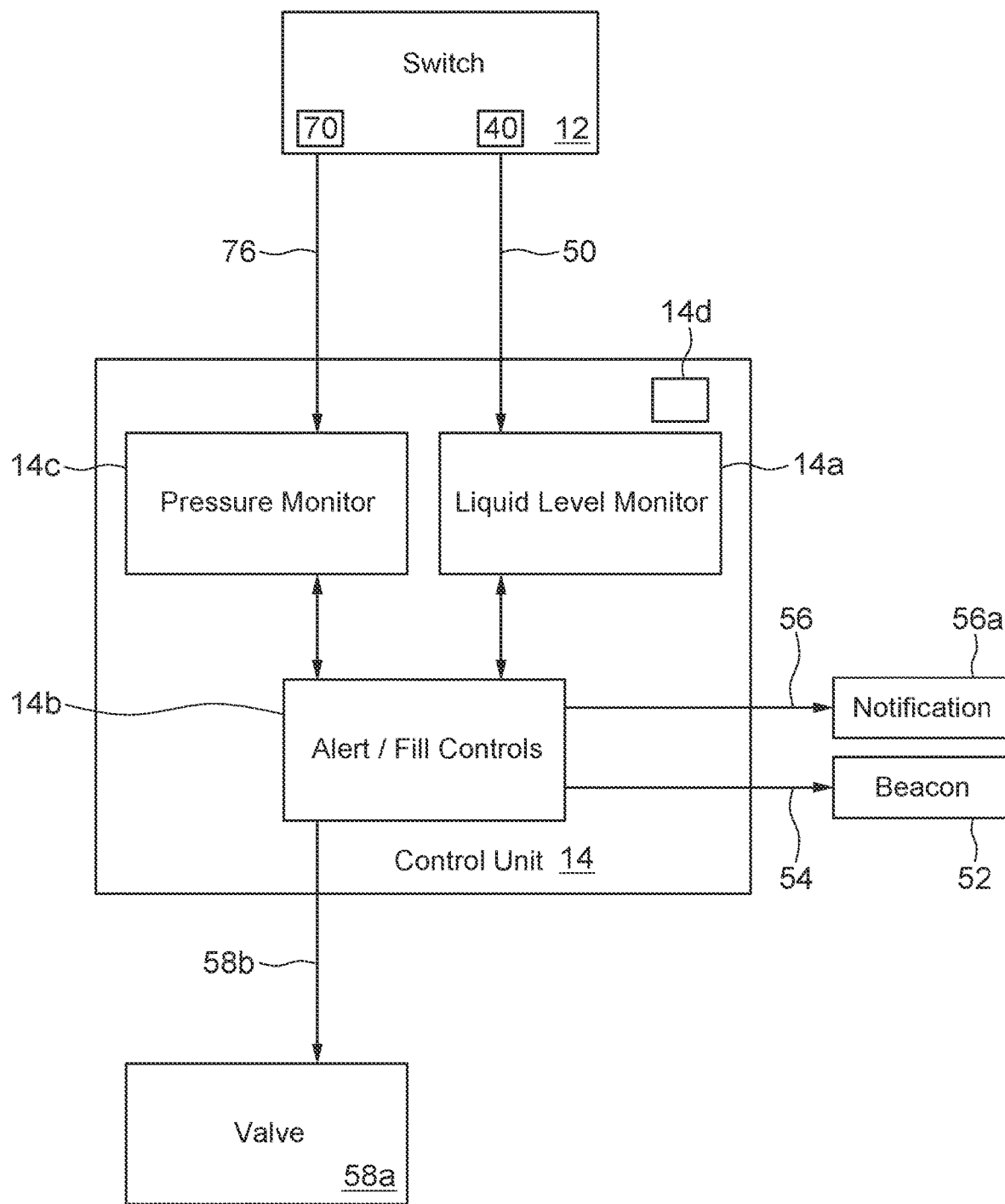
FIG. 4 is a block diagram of the overall tank fill switch and its connections.
Figure 5:
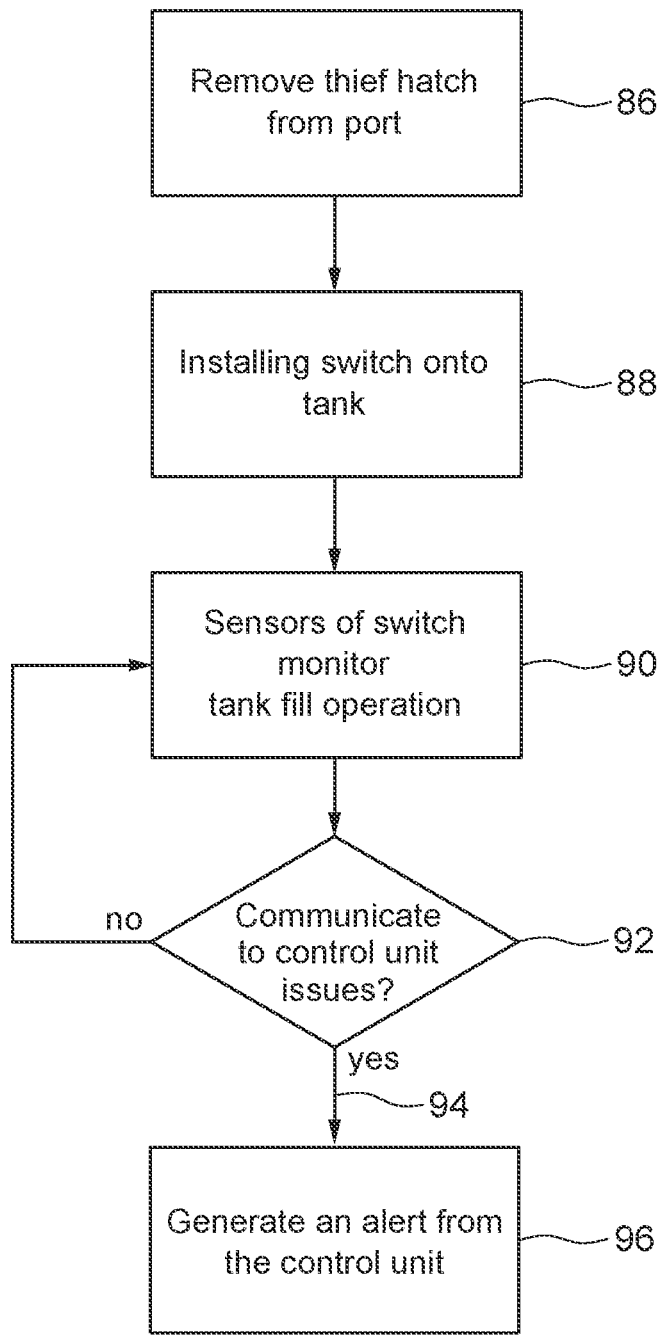
FIG. 5 is a flow chart showing a method according to the present invention.

Tank-installed switch 12 may further include an overpressure sensor 70 configured to sense an over pressure condition in the tank and further configured to communicate the over pressure condition to the control unit 14 at least when an over-pressure condition is sensed. In one embodiment, over-pressure sensor 70 includes an internal detector 72 configured for communicating through a line 76 or wirelessly to the control unit. The over-pressure sensor 70 may be configured to either regularly report pressure or report when pressure exceeds a selected over-pressure range. In one embodiment, the pressure sensor is a switch that communicates with the control unit via an electrical circuit (FIG. 2B). The over-pressure range may exceed the pressure relief rating of thief hatch 24, such as to prevent an overpressure condition at least to avoid damage to thief hatch 24. An over-pressure condition when sensed via sensor 70 and communicated to a pressure monitoring function 14c of the control unit 14 may result in the generation of an alert signal and/or a fill operation control, as described above, through function 14b.

Switch body 12 and control unit 14 may each be portable. Control unit 14, including housing 60, frame 62 and magnet 64 may be portable and readily positioned. In one typical embodiment the control unit 14 can weigh less than 75 lbs and be, for example, less than 2×2 feet in height and width. In one embodiment, control unit 14 includes a handle 68 for lifting and carrying thereof. Lines 16, 50, 76, etc. may include quick connectors 50a, such as those industry approved and zone rated, to facilitate connections and disconnections between body 12 and control unit 14.

Switch body 12 may also be configured for portability. Switch body 12 is sized for lifting by a person, but can also include a lifting eye and a clevis for lifting by a picker where it would be unsafe for manual handling due to, for example, the height or location for install. In one typical embodiment the tank switch 12 can be 3 to 5 feet high and weigh 100-140 lbs.

To install and operate the switch 10, a tank-installed switch 12 and a control unit 14 are brought to a tank of interest. The length of rod 46 may be selected with respect to the tank to select for the liquid level L that will ensure the rod positions the float in a position that causes the float 44 to float at an appropriate liquid level.

The port closure, such as thief hatch 24, is removed 86 from the upper port 22. The tank-installed switch is installed 88 onto the tank: tubular wall 28 is inserted down through the opened upper port and bolts 32 are secured through the flanges 26, 30. Control unit 14 is supported on a surface, such as for example, unit 14 is supported by frame 62 on a support surface S or attached by magnet 64 to the tank 20 or another metal surface. The communications are established between detector 40 and control unit 14. For example, lines 50, 76 are connected between the switch 12 and control unit 14. Line restraints 80 may be secured between upper body 12b, such as flange extension 82, and lines 50, 76 to support the weight of the lines and to direct them along a selected path. Thief hatch 24 is secured on the upper flange 34 or the open top is otherwise closed off. Control unit is connected to communicate with fill signalling device 52, notifications system 56a and valves 58a.

During a fill operation, the control unit is powered on and the tank-installed switch operates 90 to monitor the fill operation and sends 92 signals to the control unit.

The control unit and tank-installed switch may be configured in various ways to monitor the fill operation. For example, in some embodiments, the sensors are configured only to communicate a signal to the control unit in the event of a maximum liquid level or over pressure condition being sensed and in other embodiments, the sensors may communicate on an ongoing basis with the control unit. The control unit, as well, may have various modes of operation, including alerting directly in response to receipt of a signal and in other embodiment, the control unit further processes the signal, for example, sets timers, awaits confirmations, sends alerts and/or controls valves in series, etc.

At least, however, if either a maximum liquid level or an overpressure condition is sensed, the control unit receives a signal from the liquid level sensor 40 or pressure monitor 70.

In particular, if liquid level L within the tank rises to cause float 44 to move rod 46 sufficiently to trigger detector 42, a signal is sent via device 45 to control unit 14, which is received and processed by function 14a.

Alternately, or in addition, pressures within the tank may be relieved at hatch 24. If pressures exceed the ability of hatch 24, pressure sensor 70 sends a signal to control unit 14, which is received and processed by function 14c.

Functions 14a, 14c are processed and, if necessary 94, the alert/fill control functions 14b cause alerts to be generated 96 as by communications 54, 56 or fill controls are communicated 58.

The alerts/fill control operations may differ depending on the condition (liquid level or over-pressure) that is sensed. In one method, the control unit alerts that a liquid level maximum has been reached by illuminating a beacon 52 and/or generating an alarm at the site and sending a notification 56a to a control panel. In addition, a signal is sent to a valve 58a to discontinue or modify the filling operation to the tank.

The filling may be during a supervised filling operation, for example when a worker is filling a fuel tank or in unsupervised, such as remote operations, when liquids are flowing into various vessels. The filling may be in pressure, under vacuum or venting scenarios.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the coverage afforded by the claims. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

The invention claimed is:

1. A tank-installable switch for installation through a thief hatch port on a tank, the tank-installable switch comprising:
   a tubular body including:
      an upper end defining an open top;
      a lower end;
      an outer surface;
      an annular mounting flange on the outer surface between the upper end and the lower end, the annular mounting flange extending radially from and extending circumferentially about the tubular body and including a plurality of spaced apart boltholes configured for bolting onto the thief hatch port; and
      an upper annular flange at the upper end, the upper annular flange extending radially from and extending circumferentially about the upper end and including a plurality of spaced apart boltholes; and
   a liquid level sensor including:
      a detector;
      a float in and moveable along a length of the lower end; and,
      a rod connecting the float to the detector, the liquid level sensor configured to sense a liquid level relative to the lower end and further configured to generate a signal when at least a maximum selected liquid level is sensed.

2. The tank-installable switch of claim 1, further comprising: a control unit in communication with the tank-installed switch including:
   a liquid level monitoring function for receiving the signal from the liquid level sensor; and
   a control function for generating at least one of (i) an alert signal indicating that the maximum selected liquid level is sensed and (ii) a valve control to modify a fill operation from a tank fill system.

3. The tank-installable switch of claim 2, wherein the tank-installed switch and the control unit are in communication by lines or wirelessly.

4. The tank-installable switch of claim 2, wherein the tank-installed switch further comprises: a pressure sensor configured to sense a pressure within the upper end and further configured to generate a second signal when at least an over-pressure condition is sensed; and the control unit further comprises: a pressure monitoring function for receiving the second signal; and the control function is further configured for operation in response to the second signal.

5. The tank-installable switch of claim 1, wherein the tank-installed switch further comprises: a pressure sensor configured to sense a pressure within the upper end and further configured to generate a second signal when at least an over-pressure condition is sensed.

6. The tank-installable switch of claim 1, further comprising a fluid communication passage through the tubular body from the open top to the lower end, to provide a pressure relief capability.

7. The tank-installable switch of claim 1, wherein the thief hatch port has a size and a bolthole configuration and wherein the annular mounting flange and the upper annular flange are each sized to fit onto to thief hatch port and each have their plurality of boltholes arranged to conform to the bolthole configuration of the thief hatch port.

* * * * *